United States Patent Office 3,097,135
Patented July 9, 1963

3,097,135
ERYTHROMYCIN SUSPENSIONS AND METHOD OF STABILIZING THE SAME
Matthew J. Lynch, Waukegan, Ill., assignor to Abbott Laboratories, North Chicago, Ill., a corporation of Illinois
No Drawing. Filed Feb. 4, 1960, Ser. No. 6,594
16 Claims. (Cl. 167—65)

This invention relates to liquid suspensions of erythromycin salts or esters alone or in combination with sulfonamides and to a method of stabilizing such compositions. The term "erythromycin" as employed herein means erythromycin A unless otherwise specified, but the invention also contemplates the use of the salts and esters of erythromycin B.

It is well known that erythromycin free base is extremely bitter when taken orally in either a solid or a liquid form. Thus, solid salts and esters of erythromycin have been developed to improve the taste of this useful antibiotic. However, even these forms of erythromycin are unpleasant to ingest orally when dissolved or dispersed in an aqueous system because they hydrolyze to the free erythromycin base. Erythromycin stearate, for example, when dissolved in water slowly decomposes to erythromycin base and stearic acid which is very bitter and unpleasant to the taste. When erythromycin ethyl succinate is dissolved in water containing 40% by weight of acetone, the ester hydrolyzes to the free base at a rate of 5% per hour at room temperature. Only about 3% of the free erythromycin base can be tolerated orally before the characteristic, disagreeable, bitter taste of such base becomes objectionable.

Other problems in formulating a suitable oral preparation of erythromycin also exist. If an ester or salt of erythromycin is mixed with glycerine alone to prevent hydrolysis, one experiences a burning sensation upon oral ingestion. If the antibiotic is suspended in a vegetable oil alone, a significant percentage of the population and especially children object to the taste so produced. The salts and esters of erythromycin are insoluble in oil or water alone. Lecithin is incompatible with erythromycin in any form. Erythromycin base and most erythromycin derivatives are stable at a pH of 7 whereas the sulfonamides are stable at a pH of about 10. Thus, if the erythromycin is stabilized, the sulfonamide is not. To counteract these innumerable problems, the salts and esters of erythromycin alone or in combination with the sulfonamides have been marketed as solids which must be reconstituted with water just prior to oral administration.

It is an object of the present invention to provide a method for the stabilization of erythromycin salts or esters alone or in combination with sulfonamides in liquid form which are admirably suitable for oral administration.

Another object is to provide stable erythromycin liquid compositions which are extremely pleasant to the taste and very acceptable to children when orally ingested.

A further object of this invention is to provide a stable, anhydrous, liquid suspension of erythromycin salts or esters alone or in combination with various sulfonamides which will give high blood level responses even when ingested into a highly acidic stomach.

More specifically, it is a still further object to provide a stable, anhydrous, liquid suspension of erythromycin ethyl succinate in an oil-glycerine medium containing a buffer, sweetening agent, flavoring, emulsifier and an antioxidant which is well adapted for oral administration and highly palatable.

Other objects will become apparent throughout the ensuing specification and appended claims.

It has now been found that all the foregoing objects can be accomplished by preparing an emulsion of vegetable oil and glycerine and suspending a salt or ester of erythromycin A or erythromycin B alone or in combination with one or more sulfonamides in said emulsion. The resulting mixture is extremely stable, does not hydrolyze, is very pleasing to the taste when orally ingested and produces high levels of erythromycin in the blood.

The amount of vegetable oil employed can vary from 10% to 50% by weight of the ultimate composition and the amount of glycerine employed can be varied inversely from 50% to 10% of the total composition. The oil is dispersed in the glycerine which effectively masks the vile taste of the oil alone and the burning sensation of glycerine is overcome by the presence of the oil. The remaining 40% of the composition consists of from 5% to 25% by weight of a suitable buffer such as sodium citrate and the like, from 1% to 6% by weight of a suitable salt or ester of erythromycin A or erythromycin B, from 5% to 10% by weight of one or more sulfonamides and minor amounts of sweetening agents, flavors, emulsifiers, dyes and antioxidants. Vegetable oils which have been found to be highly desirable are cocoanut oil, sesame oil, corn oil, safflower oil, cottonseed oil and peanut oil but the latter four oils are preferred. Any commercial emulsifying agent which is compatible with erythromycin is suitable but glycerolmonostearate, sorbitan trioleate, polyoxyethylene sorbitan monopalmitate or a complex of alginic acid with propylene glycol or mixtures thereof are preferred. The same is true of the antioxidant employed provided it is non-toxic and effective. However, a mixture of butylated hydroxyanisole and propylgallate in propylene glycol is especially suitable for the practice of the invention. Any known ester or salt of erythromycin A or erythromycin B can be employed as the active ingredient but erythromycin ethyl succinate, erythromycin diacetate, erythromycin lactobionate, erythromycin stearate and erythromycin propionate are most desirable. In like manner, any well-known sulfonamide or mixtures thereof may be incorporated in the claimed compositions but sulfadiazine, sulfamerazine and sulfamethazine are preferred.

The detailed examples which follow are presented to merely illustrate how the invention can be practiced and are not to be construed as the sole embodiments thereof. It is not my intention to restrict this invention to the exact proporions or ingredients employed in said examples since many variations contemplated to be within the scope of the invention will become apparent to those skilled in the art upon reading these examples.

EXAMPLE 1

A suspension is compounded from the following ingredients:

| | |
|---|---|
| Erythromycin ethyl succinate  g | 47.0 |
| Peanut oil  g | 420.0 |
| Sodium citrate  g | 50.0 |
| Polyoxyethylene sorbitan monopalmitate  g | 1.0 |
| Sodium cyclamate  g | 3.0 |
| Sodium saccharin  g | 0.3 |
| Orange oil  ml | 2.0 |
| Spearmint oil  ml | 0.03 |
| Orange dye D. & C. #4  g | 0.04 |
| Glycerolmonostearate  g | 20.0 |
| Alginic acid-propylene glycol complex  g | 1.0 |
| Sorbitan trioleate  g | 30.0 |
| Butylated hydroxyanisole and propylgallate  g | 0.1 |
| Glycerine quantity sufficient to 1000.0 ml. | |

Measure out 420 ml. of glycerine and heat to 85°–90° C. Add the polyoxyethylene sorbitan monopalmitate and mix well. Separately mix the sodium citrate, sodium cyclamate, sodium saccharin, alginic acid-propylene glycol complex and dye. Add this mixture to the glycerine at 85°–90° C. with good stirring. Weigh out 420 grams of peanut oil and heat to 85°–90° C. To the peanut oil add the butylated hydroxyanisolepropylgallate, sorbitan trioleate and glycerolmonostearate with stirring until a uniform solution results. Adjust the temperature of the glycerine mixture and peanut oil solution to 75°–80° C. With good mixing, slowly add the peanut oil solution to the glycerine mixture to form an emulsion. Cool the resulting emulsion slowly to 50°–55° C. and add the erythromycin ethyl succinate in small portions. Cool the resulting suspension to 40° C. and add flavoring agents. Finally, bring the volume to 1000 ml. with additional glycerine and continue to mix until the entire mixture is cooled to room temperature. The ultimate composition contains 200 mg. of erythromycin activity per 5 ml. of solution. After three months, this suspension was analyzed chromatographically by standard procedures and found to retain from 98.1% to 99.7% of its original erythromycin activity indicating that hydrolysis to the free erythromycin base was substantially nil. The taste varied from very good to excellent and the bitter taste of the free erythromycin base was entirely absent.

EXAMPLE 2

Another suspension is compounded as follows:

| | |
|---|---|
| Erythromycin ethyl succinate _____g__ | 23.5 |
| Sulfadiazine _____g__ | 30.0 |
| Sulfamerazine _____g__ | 30.0 |
| Sodium citrate _____g__ | 50.0 |
| Polyoxyethylene sorbitan monopalmitate___g__ | 2.0 |
| Sorbitan trioleate_____g__ | 30.0 |
| Sodium cyclamate_____g__ | 3.0 |
| Sodium saccharin_____g__ | 0.3 |
| Glycerolmonostearate _____g__ | 10.0 |
| Butylated hydroxyanisole-propylgallate____g__ | 0.1 |
| Red dye F.D. & C. #2_____g__ | 0.06 |
| Peanut oil_____g__ | 420.0 |
| Cherry flavor_____ml__ | 2.0 |
| Spearmint oil_____ml__ | 0.6 |
| Glycerine quantity sufficient to 1000.0 ml. | |

Heat both the peanut oil and glycerine to 85° C. in separate containers. Dissolve the dye, polyoxyethylene sorbitan monopalmitate, sodium sacchardin, sodium cyclamate and sodium citrate in the hot glycerine. Dissolve the glycerolmonostearate, sorbitan trioleate and butylated hydroxyanisole-propylgallate in the hot peanut oil. Cool both the peanut oil and glycerine mixtures to 50° C. slowly with vigorous stirring. Suspend the sulfadiazine, sulfamerazine and erythromycin ethyl succinate in a small portion of the peanut oil solution making a paste of ointment consistency. Maintain a temperature of 50° C. and stir vigorously. Slowly add the remainder of the peanut oil solution to the sulfa-erythromycin suspension. Mix the peanut oil and glycerine fractions with good stirring at a temperature of 50° C. or lower. Continue stirring until a smooth emulsion is formed. Reduce the temperature to 40° C. and add flavors with constant stirring. Finally, ball mill the suspension to reduce particle size and insure homogeneity. The finished product contains 100 mg. of erythromycin per 5 ml. of ultimate mixture. This product was found to retain its pleasant taste and stability for several months at room temperature.

Various formulations prepared as described in Example 1 were allowed to stand at various temperatures for periods of time ranging from two weeks to three months and thereafter assayed for erythromycin activity to determine if decomposition to the free erythromycin base had occurred to any appreciable extent. The results obtained were as shown in Table 1.

Table 1

STABILITY OF ERYTHROMYCIN IN ANHYDROUS LIQUID MEDIUM

| Serial No. of test sample | Initial assay | 50° C. | | 40° C. | | 25° C. | |
|---|---|---|---|---|---|---|---|
| | | 2 weeks | 4 weeks | 1 month | 3 months | 1 month | 3 months |
| | Percent | Percent | Percent | Percent | Percent | Percent | Percent |
| 63 | 100 | 98 | 107 | 98 | 95 | 100 | 100 |
| 64 | 99 | 97 | | 103 | 88 | 97.5 | 99.5 |
| 6 | 96 | 107 | 97.5 | 96 | 100 | 105 | 100 |

The data in the above table show that erythromycin ethyl succinate is extremely stable when suspended in an anhydrous liquid medium. In contrast, the succinate ester when dissolved in water containing 40% by weight of acetone hydrolyzed to the free erythromycin base at a rate of 5% per hour at room temperature.

Similar compositions possessing the highly desirable stability and pleasant taste of the compositions shown in the detailed examples can be readily prepared by substituting an equivalent amount of the propionate, stearate, diacetate or lactobionate of erythromycin A or erythromycin B for the erythromycin ethyl succinate and by replacement of the peanut oil with such oils as corn oil, safflower oil, cottonseed oil, cocoanut oil or sesame oil.

Erythromycin ethyl succinate can be conveniently prepared as follows: erythromycin base (30.0 grams) is dissolved in 200 ml. of dry acetone and 13 grams of dry sodium bicarbonate is added thereto. Ethyl β-chloroformyl propionate (6.7 grams) is then mixed with 20 ml. of dry acetone and this solution is added dropwise to the erythromycin solution over a period of one hour. The reaction is stirred for about 2 hours thereafter at room temperature and then allowed to stand overnight. The following day, 200 ml. of water is added and the precipitate separated by filtration, washed with water and dried under vacuum. The erythromycin ethyl succinate thus obtained is recrystallized from an acetone-water mixture and melts at 110° C.

What I claim is:

1. A method for the stabilization of liquid compositions containing erythromycin which comprises suspending a member of the group consisting of the salts and esters of erythromycin A and erythromycin B in an anhydrous vegetable oil-glycerine emulsion at a pH of 7–10 to render said compositions suitable for oral use.

2. A method as claimed in claim 1 in which the erythromycin ester employed is erythromycin ethyl succinate and the anhydrous vegetable oil employed is peanut oil.

3. A method as claimed in claim 2 in which an effective dose of at least one of the group consisting of sulfadiazine, sulfamerazine and sulfamethazine is added to the combination.

4. A method of stabilizing erythromycin ethyl succinate which comprises heating a mixture of glycerine and emulsifying agent at a temperature of 85°–90° C., separately mixing a buffering agent, sweetening agent, emulsifying agent and dye which is thereafter added to the glycerine mixture first prepared at a temperature of about 90° C., adding to the resulting glycerine mixture an anhydrous peanut oil solution containing an antioxidant and emulsifying agent at a temperature of about 80° C., cooling the resulting anhydrous emulsion to about 50° C., adding the erythromycin ethyl succinate thereto and thereafter further cooling the resulting anhydrous suspension to about 40° C. and adding a suitable flavoring agent at a pH of 7–10 to render the resulting suspension suitable for oral use.

5. A method as claimed in claim 4 in which from 10% to 50% of anhydrous peanut oil and from 50% to 10% of glycerine based on the total weight of the mixture is employed.

6. A stable, anhydrous, liquid composition of erythromycin devoid of bitter taste and suitable for oral administration which consists essentially of from 10 to 50 weight percent of vegetable oil, from 50 to 10 weight percent of glycerine, from 1 to 6 weight percent of a member of the group consisting of acid-addition salts and esters of erythromycin, from 10 to 25 weight percent of a buffering agent and minor amounts of emulsifying agents, sweetening agents, antioxidants, dyes and flavoring agents at a pH of 7–10.

7. A composition as claimed in claim 6 wherein the vegetable oil employed is a member of the group consisting of peanut oil, cocoanut oil, corn oil, sesame oil, safflower oil and cotton seed oil.

8. A composition as claimed in claim 6 wherein the erythromycin compound employed is erythromycin propionate.

9. A composition as claimed in claim 6 wherein the erythromycin compound employed is erythromycin ethyl succinate.

10. A composition as claimed in claim 6 wherein the erythromycin compound employed is erythromycin stearate.

11. A composition as claimed in claim 6 wherein the erythromycin compound employed is erythromycin diacetate.

12. A composition as claimed in claim 6 wherein the erythromycin compound employed is erythromycin lactobionate.

13. A composition as claimed in claim 6 wherein an effective dose of at least one of the group consisting of sulfadiazine, sulfamerazine and sulfamethazine is added to the combination.

14. A composition as claimed in claim 6 wherein the buffering agent employed is sodium citrate.

15. A stable, anhydrous, liquid composition of erythromycin devoid of bitter taste and suitable for oral administration which consists of an intimate mixture of 47 grams of erythromycin ethyl succinate, 420 grams of peanut oil, 50 grams of sodium citrate, one gram of polyoxyethylene sorbitan monopalmitate, 3 grams of sodium cyclamate, 0.3 gram of sodium saccharin, 2 milliliters of orange oil, 0.03 milliliter of spearmint oil, 0.04 gram of orange dye, 20 grams of glycerolmonostearate, one gram of alginic acid-propylene glycol complex, 30 grams of sorbitan trioleate, 0.1 gram of a mixture of butylated hydroxyanisole and propylgallate and sufficient glycerine to make up to one liter of ultimate mixture at a pH of 7–10.

16. A stable, anhydrous, liquid composition of erythromycin and sulfonamides devoid of bitter taste and suitable for oral administration which consists of an intimate mixture of 23.5 grams of erythromycin ethyl succinate, 30 grams each of sulfadiazine and sulfamerazine, 50 grams of sodium citrate, 2 grams of polyoxyethylene sorbitan monopalmitate, 30 grams of sorbitan trioleate, 3 grams of sodium cyclamate, 0.3 gram of sodium saccharin, 10 grams of glycerolmonostearate, 0.1 gram of a mixture of butylated anisole and propylgallate, 0.06 gram of red dye, 420 grams of peanut oil, 2 milliliters of cherry flavor, 0.6 milliliter of spearmint oil and sufficient glycerine to make up to one liter of ultimate mixture at a pH of 7–10.

References Cited in the file of this patent

UNITED STATES PATENTS

| | | |
|---|---|---|
| 1,924,990 | Harris | Aug. 29, 1933 |
| 2,372,807 | Brown | Apr. 3, 1945 |
| 2,385,262 | Curtis | Sept. 18, 1945 |
| 2,448,180 | Helgren | Aug. 31, 1948 |
| 2,529,461 | Schneiderwirth | Nov. 7, 1950 |
| 2,532,206 | Taub et al. | Nov. 28, 1950 |
| 2,675,343 | Clymer | Apr. 13, 1954 |
| 2,809,895 | Swisher | Oct. 15, 1957 |
| 2,820,741 | Endicott et al. | Jan. 21, 1958 |
| 2,914,443 | Lynch | Nov. 24, 1959 |
| 2,916,416 | Buckwalter | Dec. 8, 1959 |
| 2,919,230 | Thurmon | Dec. 29, 1959 |
| 2,975,099 | Goyan et al. | Mar. 14, 1961 |
| 3,005,754 | Cranatek | Oct. 24, 1961 |
| 3,017,323 | Gordon et al. | Jan. 16, 1962 |

FOREIGN PATENTS

| | | |
|---|---|---|
| 759,577 | Great Britain | Oct. 17, 1956 |

OTHER REFERENCES

Dement: Abstract S.N. 79,113, published October 28, 1952, 663 O.G. 1221.